United States Patent [19]

Earnest et al.

[11] 4,133,171
[45] Jan. 9, 1979

[54] TEMPERATURE STRATIFIED TURBINE COMPRESSORS

[75] Inventors: Ernest R. Earnest, Hobe Sound; Bill Passinos, North Palm Beach, both of Fla.

[73] Assignee: Hydragon Corporation, Lake Park, Fla.

[21] Appl. No.: 774,905

[22] Filed: Mar. 7, 1977

[51] Int. Cl.² .................... F02C 7/00; F02C 7/08
[52] U.S. Cl. ....................... 60/39.18 B; 60/39.52
[58] Field of Search ............. 60/39.18 B, 39.52, 618

[56] References Cited
U.S. PATENT DOCUMENTS 3,194,015  7/1965  Pacault ........................ 60/39.18 B
3,703,807  11/1972  Rice ............................... 60/39.52
3,844,113  10/1974  Lockwood .................... 60/39.52

FOREIGN PATENT DOCUMENTS 1262074  2/1968  Fed. Rep. of Germany ......... 60/39.52

Primary Examiner—Louis J. Casaregola
Attorney, Agent, or Firm—Harness, Dickey & Pierce

[57] ABSTRACT

A method and apparatus for improving the efficiency of a compressor of a gas turbine engine is disclosed. The inlet gas entering the compressor is stratified into two portions of different temperatures. The higher temperature gas is introduced adjacent the outer tips of the compressor blades to reduce the relative Mach number of the flow at that area.

6 Claims, 6 Drawing Figures

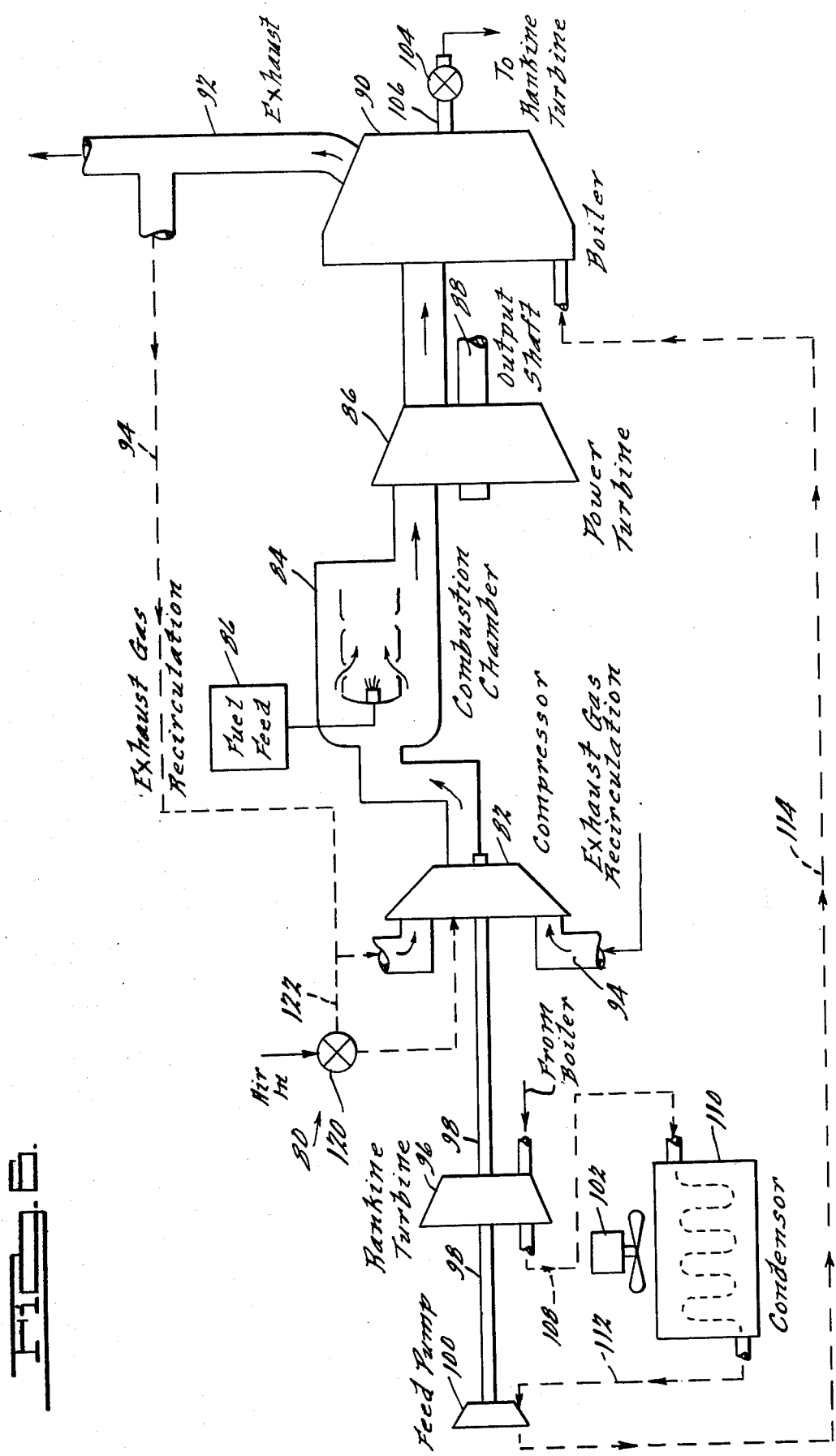

TEMPERATURE STRATIFIED TURBINE COMPRESSORS

BACKGROUND-SUMMARY OF THE INVENTION

The present invention relates to gas turbine engines and more particularly to a unique method and apparatus for increasing the efficiency of a turbine engine compressor by introducing temperature stratified air into its inlet.

For improved efficiency of a gas turbine cycle engine, it is desirable to design a turbine compressor with high pressure ratios and with a minimum of compressor stages for reduced weight and cost. In small gas turbines, a single high pressure ratio centrifugal compressor stage is often utilized.

As the pressure ratio of the compressor stage is increased, it is necessary to increase the rotor blade tip velocities and relative gas velocities. As the relative gas velocities exceed the speed of sound (Mach 1.0), however, shocks develop in the compressor and flow losses occur. The flow first becomes supersonic at the blade tips of the first compressor stage in axial compressors, or at the inducer blade tips of a centrifugal compressor stage. When the relative Mach number of the inlet blade tip becomes excessive, strong shock patterns develop and compressor efficiency and flow capacity decrease. This occurs even though the relative Mach numbers at the mid and inner (hub) portions of the rotor blades remain at subsonic velocities.

The present invention has its overall object to improve gas turbine engines and more particularly to improve the efficiency of the compressors of such engines. Another object is to improve the efficiency of a single-stage high pressure ratio turbine compressor for use with a Brayton cycle engine or with an integrated combinbed Brayton-Rankine cycle engine (IBRE). A further object is to reduce the relative Mach number of the inlet fluid to a gas turbine engine compressor in the area of the rotor blade tips in order to prevent or reduce supersonic shocks in the engine. A still further object is to temperature stratify the inlet fluid to the compressor to increase the efficiency thereof.

These and other objects are achieved by the present invention where the inlet fluid entering the compressor is temperature stratified into two portions and the higher temperature fluid is injected in the area of the rotor blade tips. The higher temperature portion of the stratified inlet fluid may be derived by recirculating part of the engine exhaust which is at a higher temperature than the ambient air. The higher temperature fluid at the blade tips reduces the relative Mach number.

Still further objects, features and advantages of the invention will become apparent upon consideration of the present disclosure and the accompanying drawings and claims.

BRIEF DESCRIPTION OF THE DRAWINGS

FIG. 5 is a schematic diagram of a Brayton-cycle closed-loop gas turbine engine in accordance with the present invention; and FIG. 6 is a schematic diagram of an integrated combined Brayton-Rankine cycle engine in accordance with the present invention.

DESCRIPTION OF THE PREFERRED EMBODIMENTS

Figure 1:
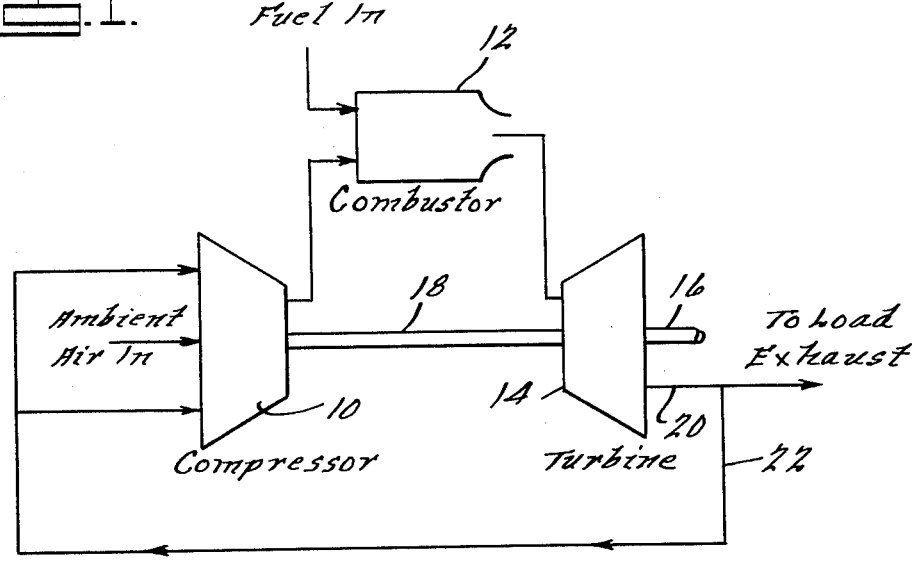
FIG. 1 is a schematic diagram of a Brayton-cycle open-loop gas turbine engine in accordance with the present invention.

The basic features of an open-loop Brayton-cycle gas turbine engine are shown schematically in FIG. 1. The working fluid enters the engine through an appropriate duct (not shown) and is raised to a pressure of several atmospheres by a compressor 10. The working fluid in open-cycle Brayton engines is predominantly the ambient medium; that is, air, which flows through the machine and out. From the compressor, the high pressure air enters the combustion chamber (burner) 12 where fuel is added and ignited to raise the temperature of the air. The fuel is added by any conventional fuel feed mechanism (not shown). The combustion products are expanded through a power turbine 14 which is coupled to a load via power output shaft 16. The turbine 14 is connected by a shaft 18 to the compressor 10 and drives it.

The working fluid (air) is exhausted from the engine via a duct 20 and a portion of it is recirculated via duct 22 to the inlet of the compressor 10. The recirculated gas will be at a higher temperature than the ambient air and the two volumes of gases are temperature stratified and induced into the compressor in that manner.

Figure 3:
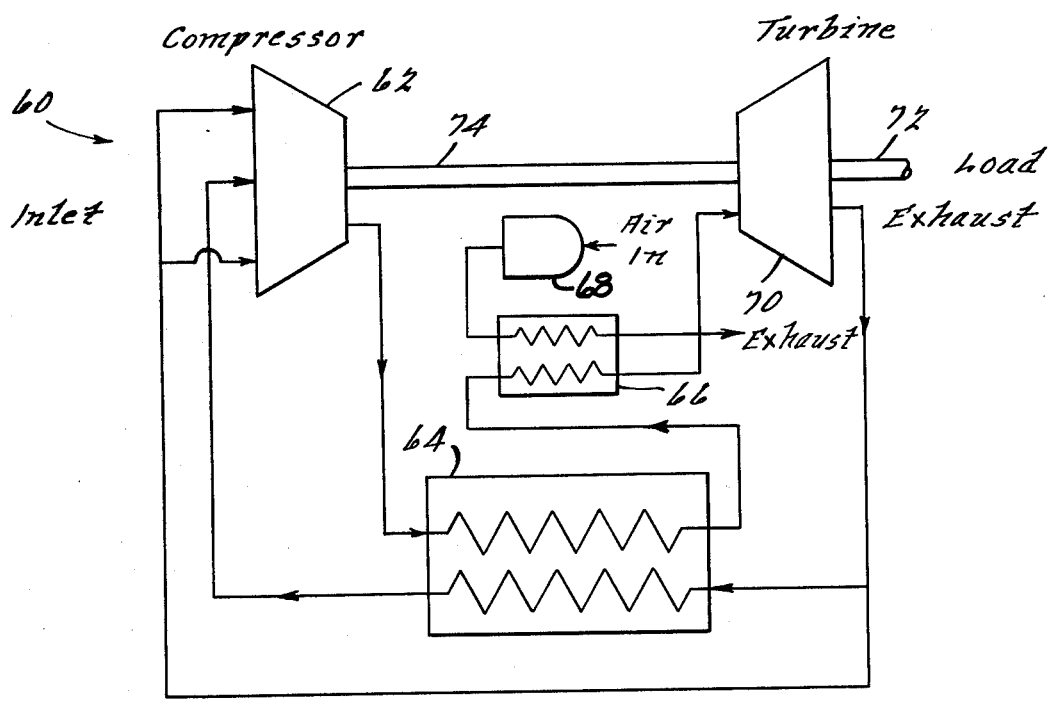
FIGS. 2 and 3 illustrate an embodiment for temperature stratifying the inlet fluid.
Figures 2, 3:
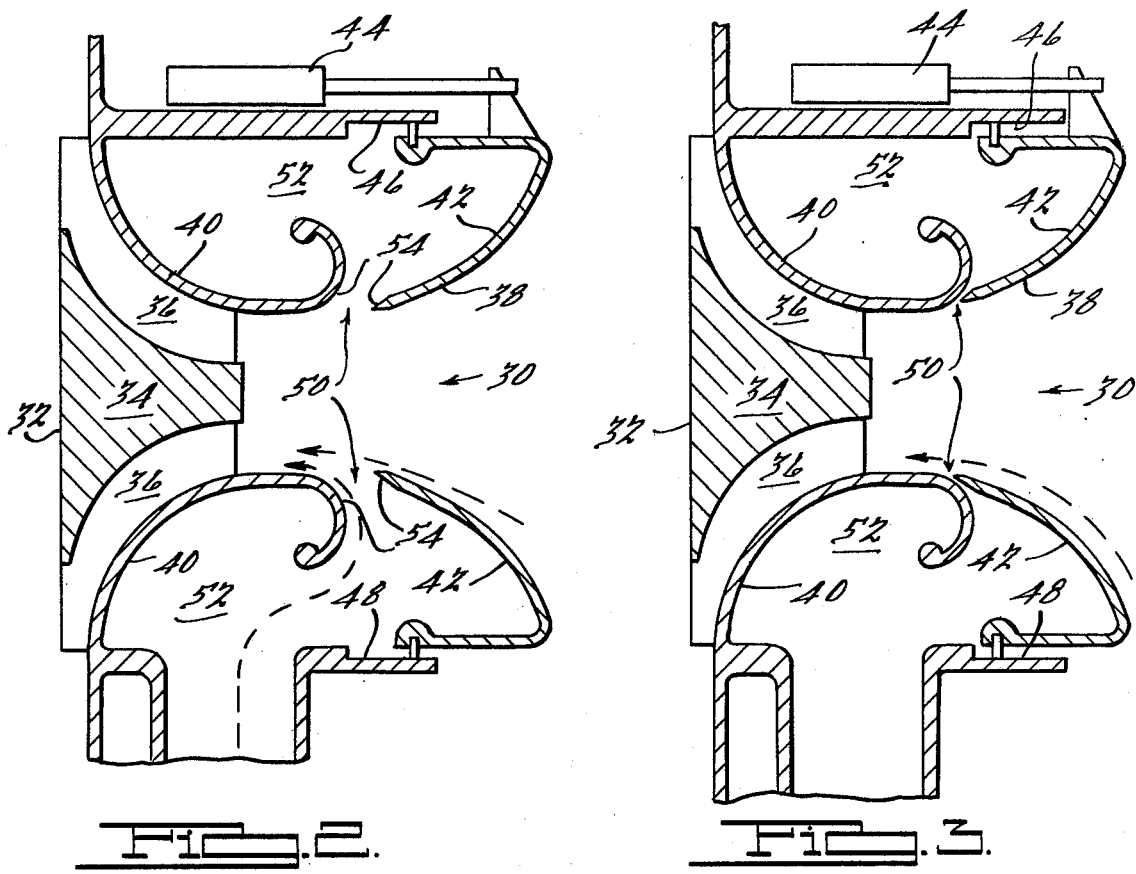

FIGS. 2 and 3 illustrate one embodiment of a structure which can be used to stratify the inlet fluids to the compressor 10. The inlet to the compressor is designated generally by the numeral 30. The compressor rotor 32, having a central hub 34 and a plurality of blades 36, is situated in the center of the inlet 30. A sloped inlet passage (or "bellmouth") 38 directs the inlet fluid into and through the compressor. The bellmouth 38 has an annular stationary portion 40 and an annular movable portion 42. The stationary portion 40 is preferably part of or fixed securely to the housing of the engine. The movable portion 42 is connected to a plurality of actuators 44 which, when activated, operate to slide the movable portion in tracks 46 and 48 and open and close passageway 50.

The recirculated exhaust gas is directed into the annular shaped cavity 52 formed in the bellmouth housing. When it is not desired to introduce the recirculated gas into the compressor, the opening 50 is closed (as shown in FIG. 3) and all of the air entering the compressor inlet 30 is ambient. When it is desired to recirculate the heated exhaust gases into the compressor, the passageway 50 is opened. From the opening 50, the exhaust gases will flow along the surface of the bellmouth and enter the compressor in the area of the tips of the rotor blades. The flow of ambient air will assist in drawing the exhaust gases from chamber 52 and presenting it to the compressor rotor at the blade tips. To insure that the gases in chamber 52 flow along the surface of the bellmouth and do not mix significantly with the ambient air, the outlet surfaces of opening 50 are inclined toward the bellmouth surface in the direction of the rotor. The gases in chamber 52 thus enter the inlet 30 at an angle along the axis of the inlet.

The activiation of the movable portion 42 and thus of the opening 50 is controlled by an appropriate control mechanism (not shown). The control mechanism can be of any conventional type and may be operated electromagnetically, hydraulically, mechanically, or pneumatically. The control mechanism is programmed to open and close the opeing 50 to allow exhaust gas recirculation when desired, and also to control the amount of recirculation of exhaust gases by varying the size of the opening 50.

The temperature stratification of the compressor inlet air increases the local sonic velocity at the rotor inlet blade tips thereby lowering the local relative Mach number. This is written as:

$$M_{tip} = W_{tip}/A_{tip}$$

where $M_{tip}$ is the relative Mach number at the blade tips, $W_{tip}$ is the relative velocity of the blade tips, and $A_{tip}$ is the local sonic velocity at the blade tips.

Figure 4:
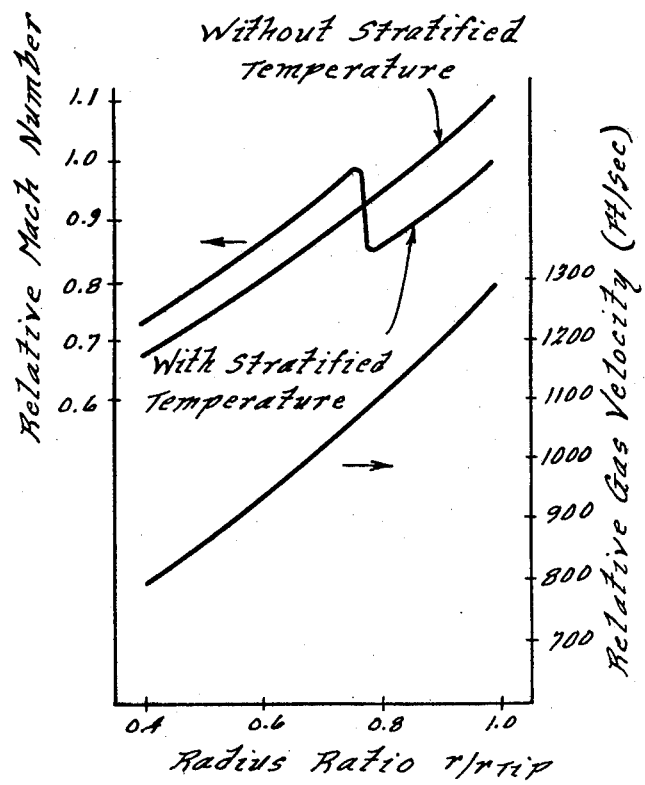
FIG. 4 is a graph illustrating the advantages of the present invention.

FIG. 4 shows a plot of the relative velocity and Mach number versus the relative radius from hub to tip of the rotor inlet. A step change in relative Mach number occurs at the gas stratification intersection due to change in local sonic velocity. Continuity of volume flow requires that the interface of the two gas streams of different temperature occur at a diameter of approximately 77% of the tip diameter.

Also shown in FIG. 4 is the same plot for a case where the inlet gases are not temperature stratified, but are premixed to the mean temperature. In this case, the relative Mach number at the tips of the blades achieves a value over 1.0, which results in greater shock losses.

The compressor rotor, pressure ratio, and exhaust gas recirculation can be analyzed to design a gas turbine engine having the advantages of the present invention. Assume that a Brayton cycle engine is to operate with a portion of the exhaust gas recirculated to the compressor inlet. A single stage centrifugal compressor is utilized and it is desired to design the compressor to optimize its efficiency at a higher pressure ratio of 8 to 1. At the design point, the gas entering the compressor will be made up of 40% by weight exhaust products at a temperature of 732° R and 60% by weight ambient air at a temperature of 519° R. For the present analysis, the small differences in gas specific heats will be neglected so it will be assumed that the mean temperature of the gases entering the compressor is (0.4 × 732) + (0.6 × 519) = 604° R.

The rotor is designed with inlet blade angles to accomodate a uniform axial approach velocity and with an inlet hub to tip diameter ratio of 0.4. The inlet gases are stratified by temperature with the higher temperature gas stream entering the outermost portion of the rotor and the lower temperature air entering the center annulus near the hub. As indicated above, the interface of the two streams occurs at a diameter of 77% of the tip diameter.

Based on the required volume flow and rotor hub diameter for the engine, the blade inlet angles are selected to minimize the rotor tip diameter. The rotor operating speed is then selected to provide a maximum relative Mach number of 1.0 based on local gas temperature. It has been found that excessive inlet shock losses and reduced efficiency will be experienced if the inlet relative Mach number exceeds the value. However, in high pressure ratio compressors, it is desirable to design the compressor for the highest allowable rotating speeds and relative Mach numbers in order to reduce the overall rotor diameter. Small overall diameter is desirable to minimize gas path friction losses, blade clearance losses, and disk windage losses.

As shown by FIG. 4, the relative Mach number at the tips of the rotor blades is maintained below 1.0 and shock losses are minimized when the inlet gas is temperature stratified. It may reasonably be assumed that the gases will not remain stratified throughout the entire passage through the rotor passages, or in the case of an axial compressor, through a number of successive stages. The required exit wheel speed will therefore be the same for each case defined by FIG. 4. For the non-stratified case, if the rotor speeds were reduced to allow an acceptable inlet relative Mach number, then a larger diameter rotor would be required which required which would result in higher friction, clearance and windage losses and therefore lower overall compressor efficiency. Temperature stratification of the inlet air to a high pressure ratio compressor thus makes possible a compressor designed for higher overall efficiency.

Reduced relative Mach numbers at the rotor blade tips also has the advantage of reduced noise and vibratory excitation. Further, the temperature stratification of the compressor inlet air has the additional advantage over premixing of the hot and cold working media in that the metal of the rotor will be maintained at a lower temperature in the areas of highest stress, namely the blade roots and disk hub. The area of highest temperature, namely the blade tips, normally operates at low stress levels. The temperature stratification therefore makes possible the use of rotor material of limited temperature/stress capability such as aluminum which might not be acceptable if the inlet gases were premixed.

The present invention can also be utilized with closed-loop Brayton cycle turbine engines. Such an engine 60 is shown in FIG. 5. In closed-cycle machines, the working fluid is a separate medium totally confined to the engine and cyclically recirculated through the basic process. Any noncondensible gas, including air, can be used as a working fluid, but efficiency and power density requirements dictate that a gas with better thermodynamic properties, such as helium or hydrogen, be utilized.

The working fluid enters the engine through a compressor 62 and is raised to a high pressure therein. From the compressor, the pressurized air passes through a regenerative heat exchanger 64 where it is partially heated and through a primary heat exchanger 66 where it is raised to the required working temperature by the addition of heat from an external source 68. The heated gas is then expanded through a power turbine 70 which is coupled to a load via output shaft 72. The turbine 70 also is connected by a shaft 74 to the compressor 62 and operates it.

The working fluid is exhausted from the turbine 70 and a portion of it is passed directly back to the compressor inlet, while another portion is directed into and through the heat exchanger 64. The portion of the gas which is passed through the heat exchanger arrives at the compressor inlet at a lower temperature than the other portion. The two streams of gas, each having a different temperature, are stratified with the higher temperature gas entering the outmost portion of the compressor rotor and the lower temperature gas entering centrally near the tub. The manner in which the stratified gas is presented in the compressor inlet, the purposes therefor, and the results achieved thereby, are similar to that above described with reference to FIGS. 1-4.

The present invention has particular applicability to an integrated combined-cycle Brayton-Rankine engine (IBRE). As disclosed in the inventor's copending application, Ser. No. 706,811, filed July 19, 1976, it has been found that the cycle efficiency of an IBRE is improved at part load operation by increasing the temperature of the gas entering the compressor. As specified in that application, the disclosure of which is incorporated herein by reference, the compressor inlet gas temperature may be increased by recirculating part of the engine exhaust which is at a higher temperature than the ambient air. Exhaust gas recirculation also reduces the amount of pollutants emitted by the engine and this becomes of particular importance when the engine is used in motor vehicles.

FIG. 6 illustrates an IBRE in accordance with the present invention, the engine being designated generally by the numeral 80. Air enters the engine 80 through the compressor 82 and is raised to a pressure of several atmospheres. From the compressor, the high pressure air enters the combustion chamber 84 where fuel is added and ignited to raise the temperature of the air. The fuel is added by means of a conventional fuel feed mechanism 86 which is controlled by a fuel control (not shown). The combustion products are expanded through the main power turbine 86 which is coupled to the load (not shown) via power output shaft 88. Heat from the turbine exhaust gases is used to power the heat exchanger (boiler) 90 of a closed-loop Rankine cycle using an organic working fluid. Air passing through the boiler 90 is exhausted from the engine through outlet duct 92. A portion of the exhaust gases is recirculated via conduit 94 to the compressor 82.

The fluid in the Rankine system, which preferably is toluene, pyridine, or a similar organic fluid, is vaporized in the boiler 90 and used to drive a Rankine turbine 96. The Rankine turbine 96 and the compressor 82 of the open-loop Brayton cycle have their rotors on a common shaft 98 and the work produced by the Rankine turbine 96 drive the compressor 82. The shaft 98 extends through and beyond the turbine 96 to drive a centrifugal feed pump 110. The shaft 98 also is adapted to drive gearing in a suitable gearbox (not shown) which is used to drive a number of accessories on the engine 80, such as a variable speed drive cooling fan 102.

The Rankine turbine 96 draws its vapor from the heat exchanger 90. The heat exchanger 90 is incorporated in the outlet (exhaust) passageway of the engine 10 and preferably is constructed in accordance with U.S. Pat. No. 3,874,345, although it can be of any conventional construction and configuration. In accordance with that patent, the intercycle heat exchanger 90 has an annular core consisting of parallel multiple path small diameter tubes of the same length arranged in concentric helical coils such that the fluid flow progresses from the outermost coil inward while the exhaust gases flow radially outward. A thermostatic throttle valve 104 is positioned in the conduit 106 which flows the vaporized gas from the heat exchanger 90 to the turbine 96.

From the turbine 96, the low pressure working medium is still in vapor form and passes via conduit 108 through a condenser 110 where it is cooled and liquified. The cooling of the condenser 110 is assisted by the fan 102. From the condenser 110, the liqufied Rankine fluid is delivered by conduit 112 to the feed pump 100 which in turn delivers the liquid to the heat exchanger 90 via conduit 114 for vaporization in the heat exchanger, as will be understood. It is also possible to position a counterflow regenerator into the path of the working medium between the Rankine turbine 96 and the condenser 110. A regenerator would help increase the efficiency of the Rankine cycle.

The power level of the combined engine 80 is controlled by varying the fuel flow to the combustion chamber 84. The level of fuel flow is increased or decreased in response to the operator's demand for more or less engine output power or speed.

A control system to maintain the desired cycle point temperatures and pressures throughout the Rankine loop also is provided. The Rankine cycle is controlled by the thermostatic throttle valve 104 positioned between the boiler 90 and the inlet to the Rankine turbine 96. The Rankine cycle control system is independent of the control system for the Brayton cycle and is fully automatic. It may be hydromechanical, electromechanical, or fluidic. The valve 104 controls fluid mass flow in order to maintain a constant turbine inlet temperature. For an organic working fluid such as toluene, the valve would maintain the peak Rankine cycle temperature at a constant 700° F. The Rankine turbine exit pressure varies with condensing temperature. The temperature of the condenser 110 is controlled by varying the speed of the condenser cooling fan 102 which is regulated by a variable speed drive driven, for example, by a gearbox (not shown) operated from shaft 98. The Rankine turbine is designed and controlled to operate at near constant efficiency at all times.

A portion of the exhaust gases passing from the power turbine 86 and boiler 90 are recirculated in the system. Duct 94 carries a portion of the existing exhaust gases back to the inlet of the compressor 82. At the compressor 82, two gas streams are thus presented to the system. One stream comprises ambient air and the other stream comprises the recirculated portion of the exhaust gases which is at a higher temperature than the ambient air. In a manner similar to that described above with reference to FIGS. 1-4, the higher temperature gas stream is fed into the compressor inlet at the outermost portion of the compressor rotor and the lower temperature gas stream is fed centrally into the inlet near the hub of the rotor. An appropriate mechanism, such as that shown in FIGS. 2 and 3, is utilized to temperature stratify the two gas streams at the compressor inlet.

In addition, a further portion of the exhaust gases may be mixed with the ambient inlet air upstream of the compressor at part load operation of the engine in order to further improve thermal efficiency thereof. For this purpose, a mixing valve 120 is positioned in the ambient air inlet to the compressor 82 and a portion of the exhaust gas is directed to the valve 120 by an appropriate conduit or duct 122. The operation of the mixing valve 120 and the advantages achieved by recirculating the exhaust gases in an IBRE are described in detail in copending application Ser. No. 706,811. In general, the operation of the valve is controlled by the difference between the mixed gas temperature and the ambient air temperature as a function of the turbine inlet temperature. The pre-mixing of the gas streams decreases the air mass flow, fuel mass flow, and specific fuel consumption of the engine, while increasing thermal efficiency. It also reduces the level of pollutants exhausted by the engine into the atmosphere.

For the most part, recirculation of a portion of the exhaust gases in a temperature stratified manner into the compressor will achieve all of the purposes of mixing the two gas streams, as the stratified streams are eventually mixed together downstream of the compressor. The mixing valve 120 can be provided in the system, however, to insure securing all of the advantages of exhaust gas recirculation. Also, premixing will have little effect on the advantages achieved by temperature stratification. The mixed gas comprised of exhaust gases and ambient air will still be at a lower temperature than the gas stream consisting solely of exhaust gases which is introduced at the tips of the rotor blades. The relative Mach numbers at the blade tips will still be reduced and shock losses in the compressor will be minimized.

While it will be apparent that the preferred embodiments illustrated herein are well calculated to fulfill the objects above stated, it will be appreciated that the present invention is susceptible to modification, variation and change without departing from the scope of the invention, as defined by the following claims.

I claim:

1. An integrated Brayton cycle-Rankine cycle engine comprising a Rankine turbine and a high pressure ratio, single stage rotary compressor driven thereby, said Brayton cycle using ambient air and combustion products as its working fluid, said compressor having a hub and a plurality of blades extending therefrom, a Brayton turbine and an intercycle heat exchanger heated by the exhaust of the Brayton turbine and delivering heat to the Rankine fluid for powering the Rankine turbine, and a burner and air supply assembly for delivering air from the compressor and products of combustion from the burner to the Brayton turbine, recirculation means for recirculating a portion of the exhaust gases from the Brayton turbine into the compressor, said exhaust gases being at a higher temperature than said ambient air, and a compressor inlet duct having a peripheral inlet opening communicating with said recirculation means and a central inlet opening communicating with said ambient air, whereby said recirculated exhaust gases and said ambient air are introduced into said compressor as stratified gas streams and the local relative Mach number of the fluid velocity is reduced at the tips of the compressor blades.

2. The engine as set forth in claim 1 further comprising means for opening and closing said peripheral inlet opening for selectively varying the amount of recirculated exhaust gases into said compressor.

3. The engine as set forth in claim 1 further comprising means for recirculating a second portion of said exhaust gases into the compressor, and a mixing valve positioned in said compressor duct inlet such that said ambient air passes through said mixing valve before entering said compressor, said second portion of said exhaust gases being directed to said mixing valve, said ambient air and said second portion of said exhaust gases being mixed together by said mixing valve prior to entering said compressor.

4. An engine using ambient air and combustion products as the working fluid comprising in combination a single-stage main power turbine having an inlet and an exhaust, a single-stage compressor having an inlet and outlet, said compressor having a rotor with a hub and a plurality of blades attached thereto, a combustion chamber situated between said compressor and said main power turbine, said compressor and combustion chamber supplying the main power turbine with air and products of combustion to power the same, recirculation means for recirculating a portion of the exhaust gases from said power turbine into said compressor, said exhaust gases being at a greater temperature than said ambient air, a compressor inlet duct for stratifying by temperature the recirculated exhaust gases and the ambient air into the compressor, said inlet duct having a housing with a peripheral inlet opening in communication with said recirculation means and a central inlet opening in communication with said ambient air, said recirculated exhaust gases being introduced into said compressor in an annular stream adjacent the tips of said rotor blades, said ambient air being introduced into said compressor in a central region adjacent said rotor hub, movable means for opening and closing said peripheral inlet opening, driving means including a single-stage Rankine fluid turbine for driving said compressor independently of said power turbine, said Rankine turbine having an inlet and an exhaust, a closed-loop Rankine cycle system for powering said Rankine turbine, a heat exchanger in said Rankine system positioned to absorb heat from the exhaust of said power turbine and connected to the inlet of the Rankine turbine to deliver thereto fluid vaporized in the heat exchanger, and condensing means connected to the outlet of the Rankine turbine and to the inlet of the heat exchanger for returning the condensed vaporized fluid to the heat exchanger.

5. A method for increasing the efficiency of an integrated Brayton cycle-Rankine cycle engine by reducing the local relative Mach number of the fluid velocity at the tips of the compressor blades, the engine having a Rankine turbine and a high pressure ratio single stage rotary compressor driven thereby, said compressor having an inlet and an outlet and a hub with a plurality of blades attached thereto, a Brayton turbine using air and combustion products as the working fluid and having an inlet and an outlet, an intercycle heat exchanger heated by the exhaust of the Brayton turbine and delivering heat to the Rankine fluid for powering the Rankine turbine, a burner and air supply assembly for delivering air from the compressor and the products of combustion from the burner to the Brayton turbine, said method comprising the steps of recirculating a portion of the engine exhaust gases from the Brayton turbine into the compressor inlet as an annular stream adjacent the tips of the compressor blades in order to keep the relative Mach number of the gas velocity at the blade tips below 1.0, said recirculated exhaust gases being at a higher temperature than said air, and introducing said air for the engine as a solid stream in the central region of the compressor inlet inside said annular stream of exhaust gases.

6. An integrated Brayton cycle-Rankine cycle engine comprising a Rankine turbine and a rotary compressor driven thereby, said Brayton cycle using air and combustion products as its working fluid, a Brayton turbine and an intercycle heat exchanger heated by the exhaust of the Brayton turbine and delivering heat to the Rankine fluid for powering the Rankine turbine, a burner and air supply assembly for delivering air from the compressor and products of combustion from the burner to the Brayton turbine, first recirculation means for recirculating a first portion of the exhaust gases from the Brayton turbine into the compressor, second recirculation means for recirculating a second portion of said exhaust gases into the compressor, a mixing valve positioned in the inlet to said compressor such that said air passes through said mixing valve before entering said compressor, said second portion of said exhaust gases being directed to said mixing valve, said air and said second portion of said exhaust gases being mixed together by said mixing valve prior to entering said compressor, and means for introducing said first portion of the exhaust gases and said mixed air and second portion of the exhaust gases into said compressor as stratified gas streams such that the former stream is radially outward from the latter.

* * * * *